United States Patent [19]

Green, Jr. et al.

[11] Patent Number: 5,757,763
[45] Date of Patent: May 26, 1998

[54] OPTICAL INFORMATION STORAGE VIA AMPLITUDE MODULATION

[75] Inventors: Thomas J. Green, Jr., Reading; Stephen Marcus; Gary Swanson, both of Lexington; Barry Colella, Acton, all of Mass.

[73] Assignee: Massachusetts Institute of Technology, Mass.

[21] Appl. No.: 876,018

[22] Filed: Jun. 13, 1997

Related U.S. Application Data

[63] Continuation of Ser. No. 656,696, Jun. 3, 1996, abandoned, which is a continuation of Ser. No. 273,737, Jul. 12, 1994, abandoned.

[51] Int. Cl.$^6$ ................................ G11B 7/24; G11B 3/74
[52] U.S. Cl. ............................ 369/275.3; 369/275.1; 369/94
[58] Field of Search ............................ 369/275.1–275.5, 369/284, 288, 48, 110, 111, 109, 112, 94

[56] References Cited

U.S. PATENT DOCUMENTS

| | | | |
|---|---|---|---|
| 3,905,703 | 9/1975 | Matsumoto | 356/106 R |
| 3,912,391 | 10/1975 | Fleisher et al. | 355/54 |
| 4,160,269 | 7/1979 | Kramer et al. | 365/124 |
| 4,161,752 | 7/1979 | Basilico | 358/128 |
| 4,253,019 | 2/1981 | Opheij et al. | 369/44.11 |
| 4,253,723 | 3/1981 | Kojima et al. | 350/3.72 |
| 4,360,908 | 11/1982 | Howe et al. | 369/109 |
| 4,458,345 | 7/1984 | Bjorklund et al. | 369/103 |
| 4,556,967 | 12/1985 | Braat | 369/275.3 |
| 4,684,206 | 8/1987 | Bednorz et al. | 350/96.12 |
| 4,857,719 | 8/1989 | Ando | 250/201 |
| 4,870,635 | 9/1989 | Rocheter et al. | 369/215 |
| 4,900,691 | 2/1990 | Jun | 437/52 |
| 4,969,142 | 11/1990 | Nagashima et al. | 369/109 |
| 5,068,846 | 11/1991 | Kramer | 369/275.1 |
| 5,097,464 | 3/1992 | Nishiuchi et al. | 369/112 |
| 5,121,376 | 6/1992 | Kuder et al. | 369/100 |
| 5,126,996 | 6/1992 | Ida et al. | 369/283 |
| 5,134,604 | 7/1992 | Nagashima et al. | 369/94 |
| 5,144,603 | 9/1992 | Mozume et al. | 369/44.14 |
| 5,144,617 | 9/1992 | Gotoh et al. | 369/244 |
| 5,204,852 | 4/1993 | Nakagawa et al. | 369/275.4 |
| 5,218,594 | 6/1993 | Tanno | 369/111 |
| 5,251,198 | 10/1993 | Strickler | 369/110 |
| 5,258,969 | 11/1993 | Refregier et al. | 369/100 |
| 5,283,159 | 2/1994 | Norton et al. | 369/284 |
| 5,289,454 | 2/1994 | Mohapatra et al. | 369/112 |
| 5,303,225 | 4/1994 | Satoh et al. | 369/275.3 |
| 5,327,415 | 7/1994 | Vettiger et al. | 369/121 |
| 5,350,618 | 9/1994 | Togawa et al. | 369/109 |
| 5,373,499 | 12/1994 | Imaino et al. | 369/275.4 |
| 5,381,401 | 1/1995 | Best et al. | 369/275.3 |
| 5,402,140 | 3/1995 | Yoshimnia et al. | 369/275.3 |
| 5,428,597 | 6/1995 | Satoh et al. | 369/275.1 |
| 5,453,969 | 9/1995 | Psaltis et al. | 369/112 |
| 5,463,609 | 10/1995 | Inagaki et al. | 369/112 |
| 5,471,455 | 11/1995 | Jabr | 369/107 |
| 5,477,527 | 12/1995 | Tsuchiya et al. | 365/275.4 |

FOREIGN PATENT DOCUMENTS

| | | |
|---|---|---|
| 0446063 A1 | 9/1991 | European Pat. Off. . |
| 0511023 A1 | 10/1992 | European Pat. Off. . |
| 61-227237 | 10/1986 | Japan . |
| 61-240447 | 10/1986 | Japan . |
| 7-049306 | 2/1995 | Japan . |
| WO97/01167 | 1/1997 | WIPO . |

OTHER PUBLICATIONS

E.A. Swanson et al., "In Vivo Retinal Imaging by Optical Coherence Tomography" *Optic Letts.* 18(21):1864–1867 (1993).

(List continued on next page.)

*Primary Examiner*—Nabil Hindi
*Attorney, Agent, or Firm*—Testa, Hurwitz & Thibeault, LLP

[57] ABSTRACT

A system for three-dimensionally storing and encoding information in an optical storage medium. Information at a surface location is encoded according to the surface depth or width of the location. The information is then retrieved through the use of intensity measurements of light modulated by the depth or width of the storage location. The intensity of the light represents the data value stored at the location.

4 Claims, 12 Drawing Sheets

OTHER PUBLICATIONS

B. Lenth, "Optical Storage: A Growing Mass Market for Lasers" *Laser Focus World* pp. 87–91 (1994).

D. Huang et al., "Optical Coherence Tomography" *Science* 254:1178–1181 (1991).

K. Leutwyler "Optical Tomography" *Scientific American*, pp. 147–149 (1994).

J.R. Wullert II et al., "Multiwavelength, Multilevel Optical Storage Using Dielectric Mirrors" *IEEE Photonics Tech. Letts.* 6(9):1133–1135 (1994).

Y.A. Carts, "Rewritable Optical Disk Drive Also Reads CD–ROMS" *Laser Focus World, Design and Applications*, p. 115 (1995).

"Technology Roadmap", Optoelectronic Technology Roadmap Conclusions & Recommendations, Optoelectronics Industry Development Association, Apr. 15, 1994, pp. iii–vii 1–63.

E.A. Swanson et al., "High–Speed Optical Coherence Domain Reflectometry" *Optic Letts.* 17(2):151–153 (1992). *Electronics Letters*, "Three–Dimensional Optical Disks Using Metallic Island Films: A Proposal", by K. Baba, et al., Mar. 26, 1992, vol. 28, No. 7.

*Optoelectronics, Instrumentation and Data Processing*, "Multilayer Optical Information Recording", by I.B. Rudakov, et al., 1991, No. 3.

*J. Vac. Sci. Technol.*, "Fabrication of Grooved Glass Substrates by Phase Mask Lithography", by P.J. Brock, et al., B9(6), Nov./Dec. 1991.

*SPIE Optical Storage Technology and Applications*, "Pit Shape at Overwriting of Thermal Magneto–Optical Recording", by Yamada, et al., vol. 899, 1988.

*Applied Optics*, "Optimization of Information Pit Shape and Read–Out System in Read–Only and Write–Once Optical Storage Systems", by Zhov, et al., vol. 27, No. 4, Feb. 15, 1988.

*Optical Data Storage*, "Pit Depth Encoded Memories", by D.S. Marx, et al., vol. 2338, 1994.

*Japanese Journal of Applied Physics*, "Master Recording Using Kr Ion Laser", by M. Itonaga, et al., vol. 31, Part 1, No. 2B, Feb. 1992.

PITS AND LANDS

OPTICAL INFORMATION STORAGE VIA AMPLITUDE MODULATION

This is a continuation of application Ser. No. 08/656,696 filed on Jun. 3, 1996 now abandoned, which is an FWC of Ser. No. 08/273,737, filed Jul. 12, 1994, now abandoned.

BACKGROUND OF THE INVENTION

The present invention relates to the storage retrieval of digital information through the use of amplitude modulation.

Optical digital data storage has widespread commercial acceptance. Uses include compact disks and mini disks utilized for audio reproduction, CD-ROMs utilized in distribution of data and software for computer systems, write once read many (WORM) disks used for data storage and archiving in computer systems, and erasable optical disks used for data storage in computer systems.

Optical media is an attractive storage medium for many reasons. First, optical storage has a high storage capacity. For instance, CD-ROMs can store up to 600 megabytes of data on a 12 cm disc. Second, optical storage is stable over long periods of time. And third, duplication of optical storage information recorded is inexpensive.

Current Technology in Optical Discs

FIG. 1 shows a cross section of a conventional CD-ROM disc 10. The information stored in the CD-ROM 10, represented by spiral or circles of small pits, is molded onto a surface 14. The surface 14 is then coated with a reflective metal layer 13, which is then covered with a protective lacquer 12.

The pits, as illustrated by FIG. 2, are 0.12 μm deep and about 0.6 μm wide. The neighboring turns of the spiral pattern of pits are 1.6 μm apart. This spacing corresponds to a track density of 16,000 tracks per inch (tpi), much higher than the figures associated with floppy (up to 96 tpi) or Winchester (several hundred tpi) magnetic disks.

Converting data from its raw form to the pits and lands of an optical disc involves a process known as mastering as shown in FIG. 3(a). In this process the waveform carrying the encoded information is transferred from magnetic tape to a modulator (a sort of fast shutter). The modulator controls a powerful short-wavelength laser beam 31 as it passes through optics 32, forming a spot on a photoresist coating 33 of a glass master disc 34.

The optical system moves radially while the master disc 34 spins, so that the information is laid out in the spiral track characteristic of CD-ROM. When the photoresist is developed as shown in FIG. 3(b), it turns the exposed regions into pits. (The light beam in the master recorder is shaped so as to produce the characteristic sloping walls of CD ROM and CD pits). The developed master 34 has exactly the surface profile which each usable CD ROM disc should have.

This profile is copied, as shown in FIG. 3(c), either by electroplating or photopolymer replication, onto one or more physical negatives 37. These negatives 37 are used to form the actual discs 38 sold to users. FIG. 3(d) shows that the transfer is usually done by injection molding, although several novel techniques, based on etching or cold embossing, are in pilot production. The material used in all processes is polycarbonate, a transparent plastic. This choice of material permits these discs to survive in harsh environments.

FIG. 4 illustrates the optical system utilized to retrieve the recorded data. All optical storage devices use a laser beam 41 which is focused to a very small spot 46 by special lenses 42 and 43. Most current drives including LV players, CD players, CD ROM drives, and large and small writable optical drives, use a small gallium arsenide semiconductor laser to produce this beam.

Gallium arsenide lasers produce oval beams of near-infrared light. The oval shape must be converted to a smaller circular spot about 1 μm (1/25,000 inch) in diameter in order to read the pits on the disc. To produce the small spot, it is necessary to gather the laser beam into a sharply convergent cone of light. This is accomplished through the use of special objective lens 43.

In order to read information from a CD, a laser beam 46 is focused on the disc 28 containing the spiral track of pits and the amount of light reflected back into the objective lens 43 is measured by the photodetector 44. FIG. 5 illustrates the relationship between pits and photodetector output. Light striking one of the pits is diffracted (scattered) through such a wide angle that very little finds its way back into the lens. But when the spot focuses on the flat land 52 between pits, most of it is reflected back into the lens. FIG. 6 graphically illustrates the modulated signal produced by this combination of reflected and diffracted light that actually represents the information stored on the disc.

The reflected light goes to a photo detector 44 of FIG. 4, which produces a current proportional to the light intensity. The reflected light signal thus changes each time the laser beam moves from a pit to land or the reverse. Through a decoding process, the information derived from this varying light signal is converted to digital data useable by a computer.

The capacity of optical media is limited by the two-dimensional recording density. Each spatial location on the media encodes only a single bit of digital information. Yet this density is inadequate for many applications. For example, it is estimated that to archive a single edition of a daily paper, including all images, can take anywhere from 200 megabytes to 2.5 gigabytes of storage. A single year's worth of archive for a daily paper could require up to 1 terabyte of storage, translating into approximately 1,500 conventional CD-ROM disks. It has been noted (M. Shimazu, "Will Your CD Ever Really Play the Blues?", *Photonics Spectra*, May 1993, pp. 131–132) that even a factor of two increase in density would be commercially significant.

One method of increasing storage density is through the use of three-dimensional encoding. Three-dimensional encoding of information differs from two-dimensional encoding in that each spatial location encodes more than one bit of digital information. Using three-dimensional encoding increases the storage density by a factor related to the number of bits encoded in each spatial location. Therefore, it is an object of the invention to increase storage density through the use of three-dimensional encoding of information. It is a further object of the invention to provide a simple readout strategy.

BRIEF DESCRIPTION OF THE DRAWINGS

The foregoing and other objects and advantages will become apparent from the following detailed description read in conjunction with the drawings in which.

SUMMARY OF THE INVENTION

Figure 1A:
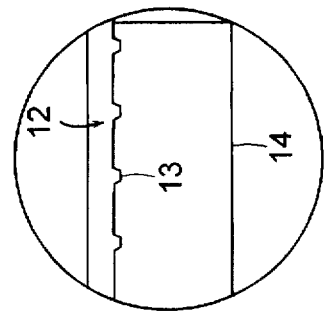
FIG. 1 is a cross section of a prior art compact disc.
Figure 1:
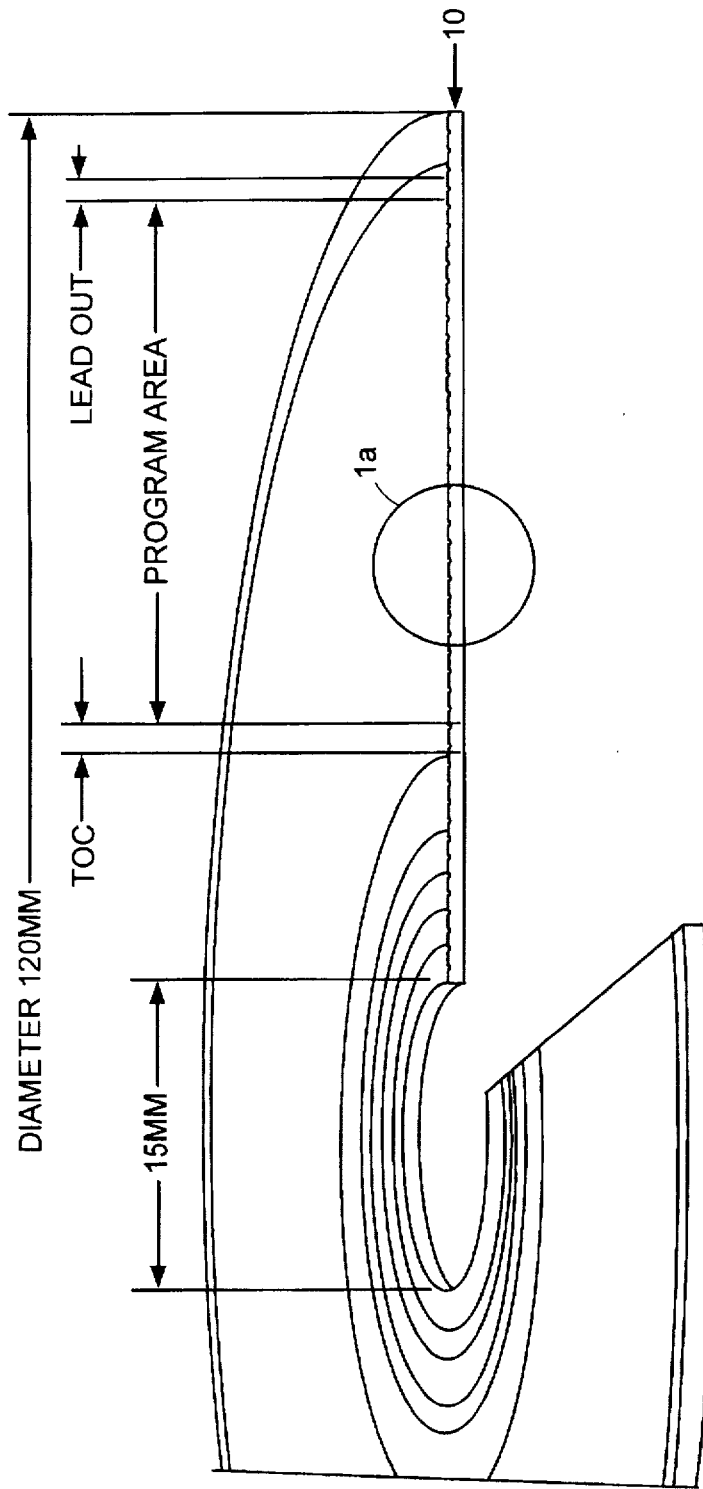
Figure 2A:
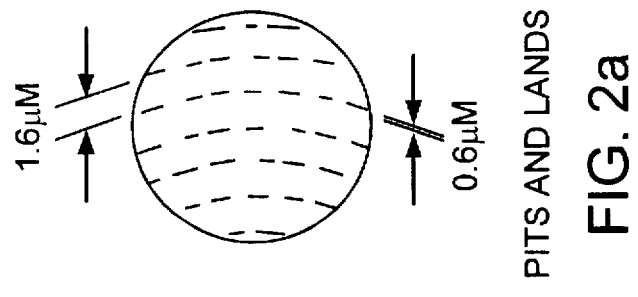
FIG. 2 is a schematic representation of the data tracks present on a prior art compact disc.
Figure 2:
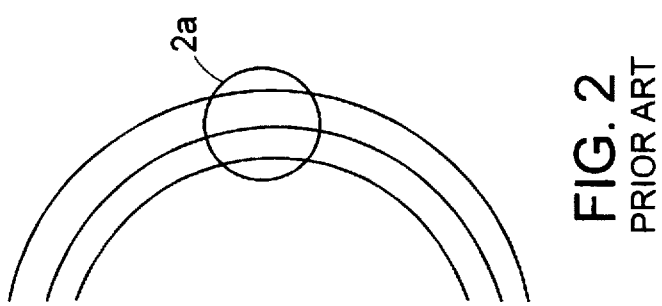
Figure 3A:
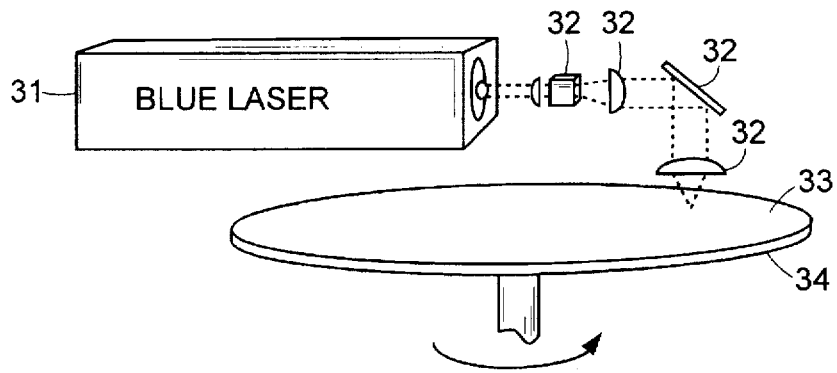
FIG. 3 is a diagram of the manufacturing process for optical discs.
Figure 3B:
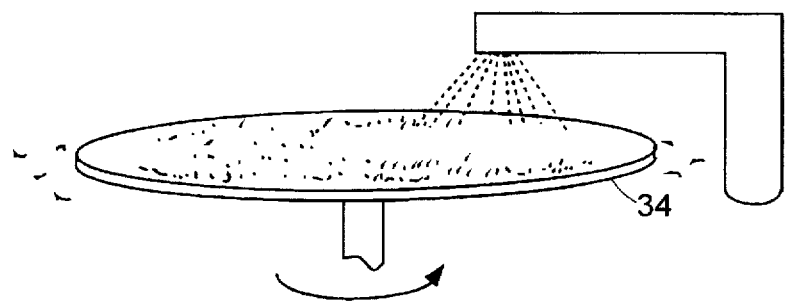
Figure 3C:
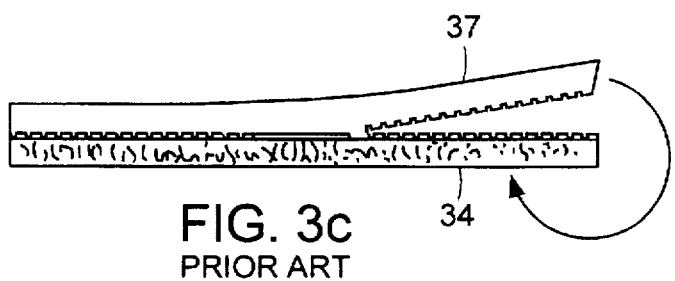
Figure 3D:
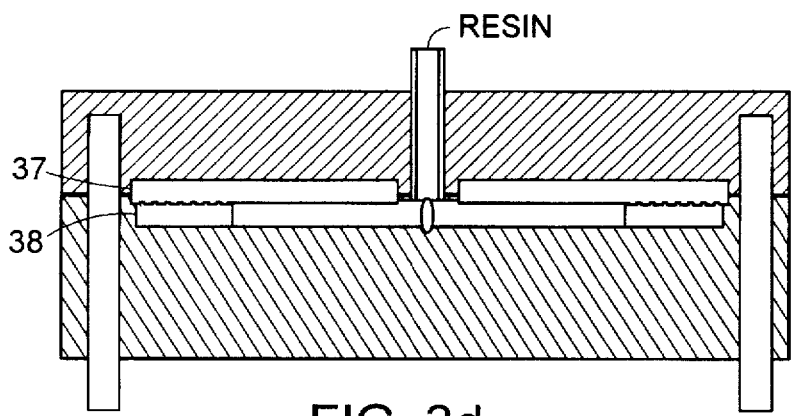
Figure 4:
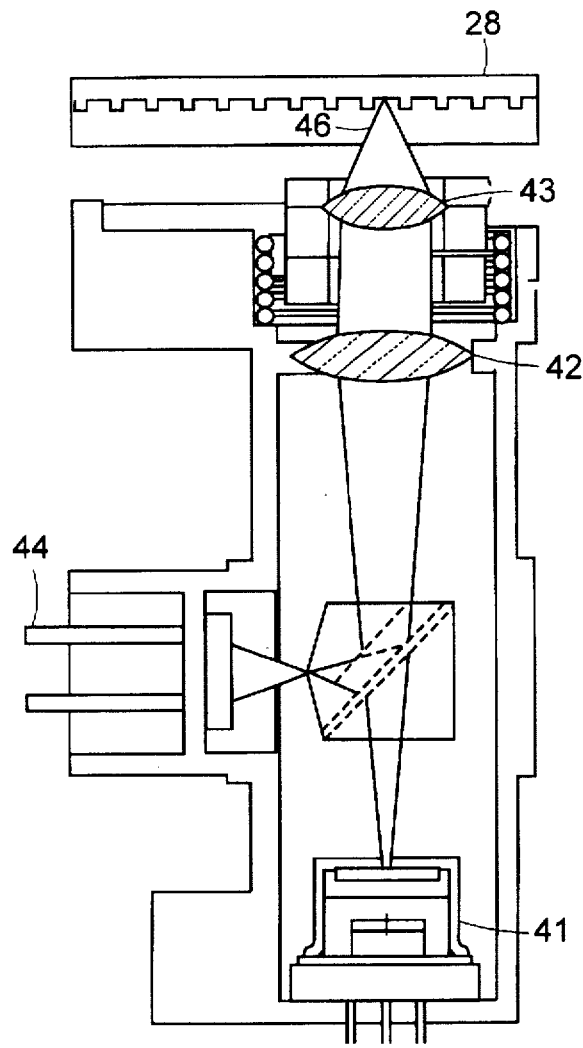
FIG. 4 is a schematic representation of a the optical retrieval mechanism of a prior art compact disc drive.
Figure 5A:
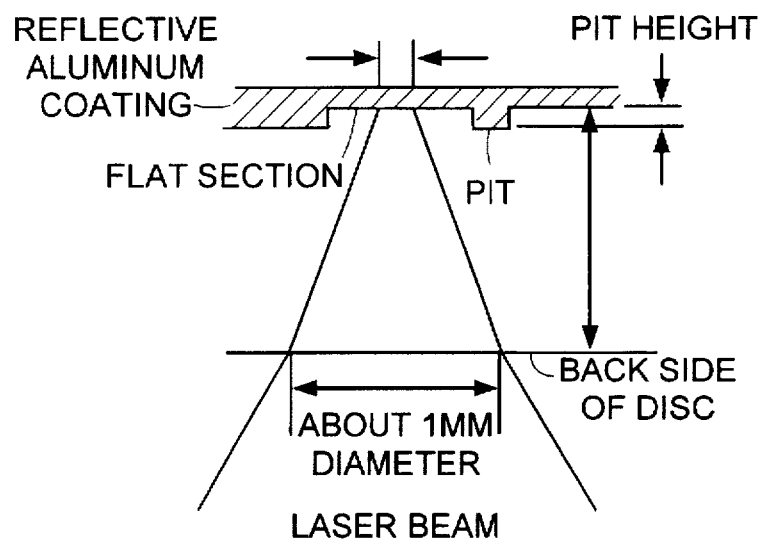
FIG. 5 is a cross sectional view of the illuminated storage areas of a prior art compact disc illuminated.
Figure 5B:
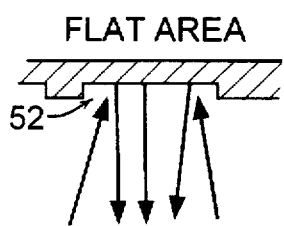
Figure 5C:
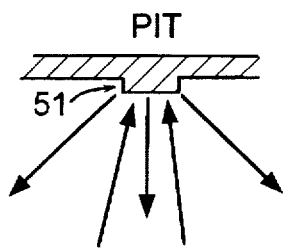
Figure 6:
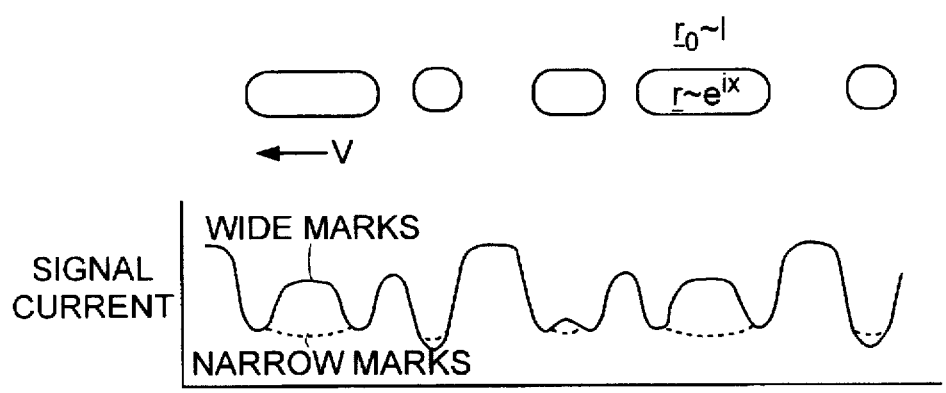
FIG. 6 is a graphical representation of the readout of storage areas of a prior art compact disc.

In accordance with the present invention, a storage system for storing and retrieving data values comprises a medium with a plurality of storage locations or regions and an optical system adapted to determine the data values stored within each region. Each region is capable of storing at least two bits of digital data. The optical system retrieves the at least two bits of digital data.

The storage regions of the system may be adapted to store or encode the at least two bits of digital information through the use of variable pit depth or width. The optical system retrieves the stored digital information through the use of interferometric measurements.

Also disclosed in the present invention, a storage medium for storing and retrieving digital information encoded according to a digital system that comprises a first medium having a variable thickness. Deposited upon the first medium is a reflective coating. A second medium is disposed on top of the first medium. This second medium has a thickness inversely related to the thickness of the first medium, such that the combination of the two mediums forms a storage medium of substantially uniform thickness. A partially reflective coating is then deposited on top of the second medium.

Radiation directed at a point on the storage medium is partially reflected by the partially reflective coating on the second medium. A portion of the radiation passes through the partially reflective coating, through the second medium and is reflected by the reflective coating on the first medium. The beam reflected by the partially reflected coating and the beam reflected by the reflective coating are interferometrically compared to determine the thickness of the second medium. This thickness represents the data value stored at that location. The storage medium may take the form of an optical disk.

In addition, a method of retrieving data in encoded according to a digital storage system comprises the steps of directing radiation onto a point of a storage system comprising a first medium having a variable thickness and a reflective coating disposed upon on the first medium. A second medium is layered onto the first medium, with the thickness of the second medium inversely related to the thickness of the first medium, such that the combination of the two mediums is substantially uniform, and with the second medium thickness being related to the data value stored at that location. A partially reflective coating is disposed on top of the second medium. The radiation is partially reflected by the partially reflective coating with a portion of the radiation transmitted through the second medium. The transmitted portion is reflected by the reflective coating. The two reflected radiation beams are compared interferometrically with a data value generated that is related to the thickness of the second medium.

Additionally disclosed are storage mediums for storing and retrieving a data value encoded according to a digital system comprising a medium with a surface. In the surface is a data region comprising either data tracks or pits. If the data region comprises data tracks, the data value is encoded at a point on a data track by having a depth of the point related to the data value. If the data region comprises pits, the data value is encoded either by varying the pit width or pit depth relative to the encoded data value. A reflective coating is disposed on the medium including the data regions. Radiation directed onto the surface including a data region is reflected by the reflective coating on the surface and by the reflective coating on the data region such that interferometric comparison of the surface reflected radiation and the data region reflected radiation determines the encoded data at said point.

DETAILED DESCRIPTION OF THE PREFERRED EMBODIMENT

Herein we propose a data storage and readout system capable of encoding multiple bits of information in a single spot or location on an optical storage medium. The system employs a laser to make amplitude modulation measurements of the readout voltage or current resulting from light intensity modulation on a photodetector. The amplitude modulation arises from an optical storage medium (i.e. an optical disk) that produces one of a number of different levels of intensity modulation at each storage location on the medium. Each different level of modulation encodes a different data level or value.

Intensity modulation arises from interference due to a phase difference between light waves of the same wavelength impinging on the energy detector. In the present invention, the light waves are modulated and reflected by the optical medium. The storage medium produces a phase difference between light waves impinging on the disk in any of a number of different ways. This phase difference creates interference in the reflected light, varying the light intensity. The amount of intensity variation or modulation is governed by the fraction of light having each of the different phases and the amount of phase difference present in the light waves. In applying the present invention to digital data storage on the optical storage medium, $2^N$ different amounts of intensity modulation are required to encode N bits of information. Any approach that produces $2^N$ variations in intensity to encode N bits of information is suitable for practicing the present invention.

Figure 7:
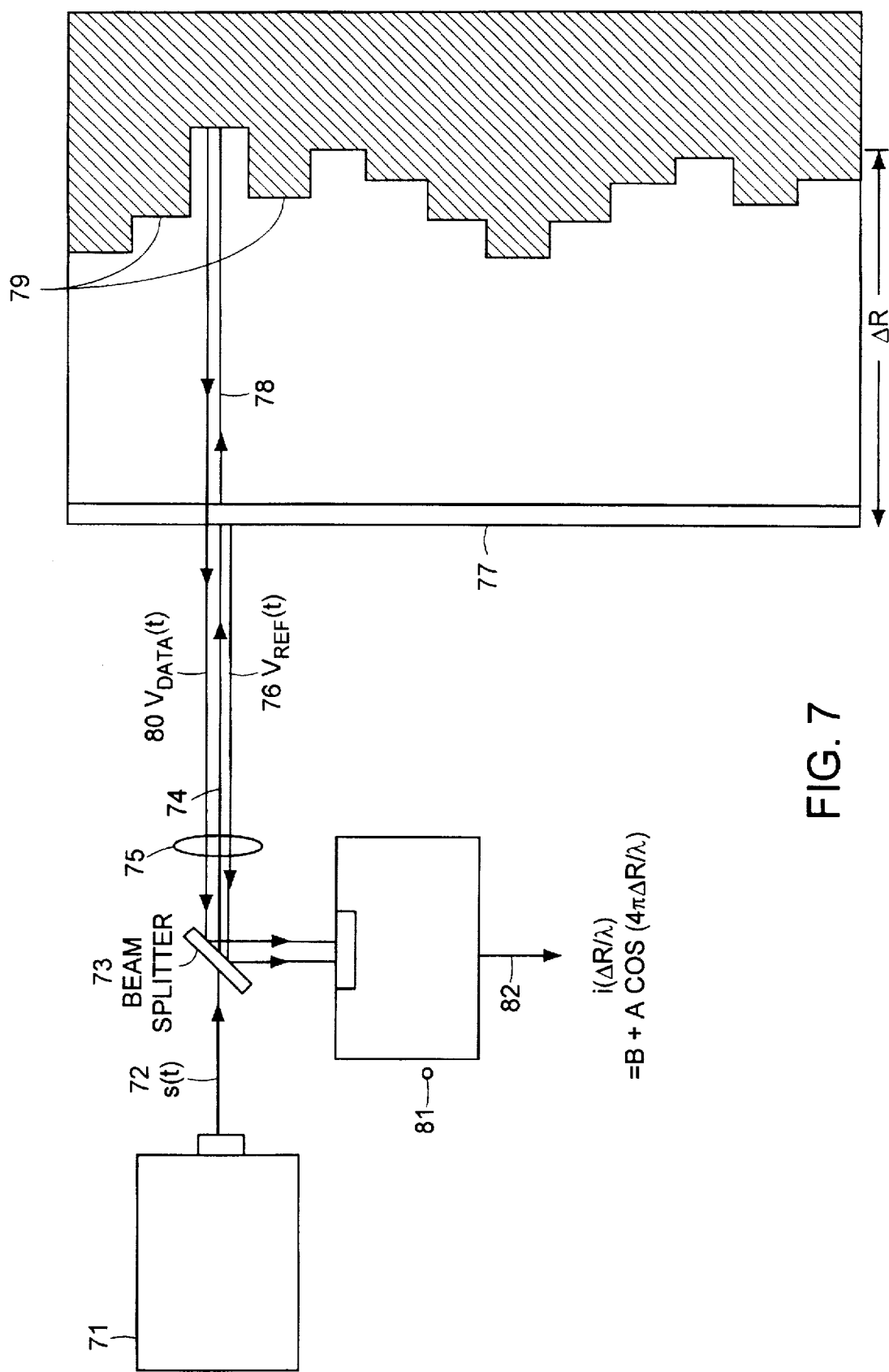
FIG. 7 is a diagram of the storage medium of the invention and an interferometric data retrieving system.

FIG. 7 illustrates one such approach. The laser 71 operates in continuous wave (CW) mode and transmits s(t), a signal 72 whose time dependence is:

$$s(t) = \cos\left(\frac{2\pi c}{\lambda} t\right)$$

After passing through a beam splitter 73, the transmit signal 74 is focused down to a small spot by a focusing lens 75 with a depth of focus that includes all informationbearing planes. The transmit signal is partially reflected 76 at a reference plane 77, yielding $v_{REF}(t)$:

$$v_{REF}(t) = K_{REF}\cos\left(\frac{2\pi c}{\lambda}(t - T_{REF})\right)$$

where $T_{REF}$ is the two-way travel-time to the reference plane. The portion of an incident signal 78 which transmits through the reference plane 77 interacts with a data plane 79 and is totally reflected 80 towards a co-located transmitter/receiver 81. The reflected signal 80, $v_{DATA}(t)$, is reflected back towards the co-located transmitter/receiver 81. The reflected signal $v_{DATA}(t)$, is:

$$v_{DATA}(t) = K_{DATA}\cos\left(\frac{2\pi c}{\lambda}(t - T_{DATA})\right)$$

where $T_{DATA}$ is the two-way travel-time to the data plane, and is given by: where $\Delta R$ is the distance between the data plane and the reference at the spot under interrogation. It is convenient to express $v_{DATA}(t)$ in terms of $v_{REF}(t)$ as follows:

$$T_{DATA} = T_{REF} + \frac{2\Delta R}{c}$$

$$v_{DATA}(t) = \frac{K_{DATA}}{K_{REF}} v_{REF}\left(t - \frac{2\Delta R}{c}\right)$$

Figure 8:
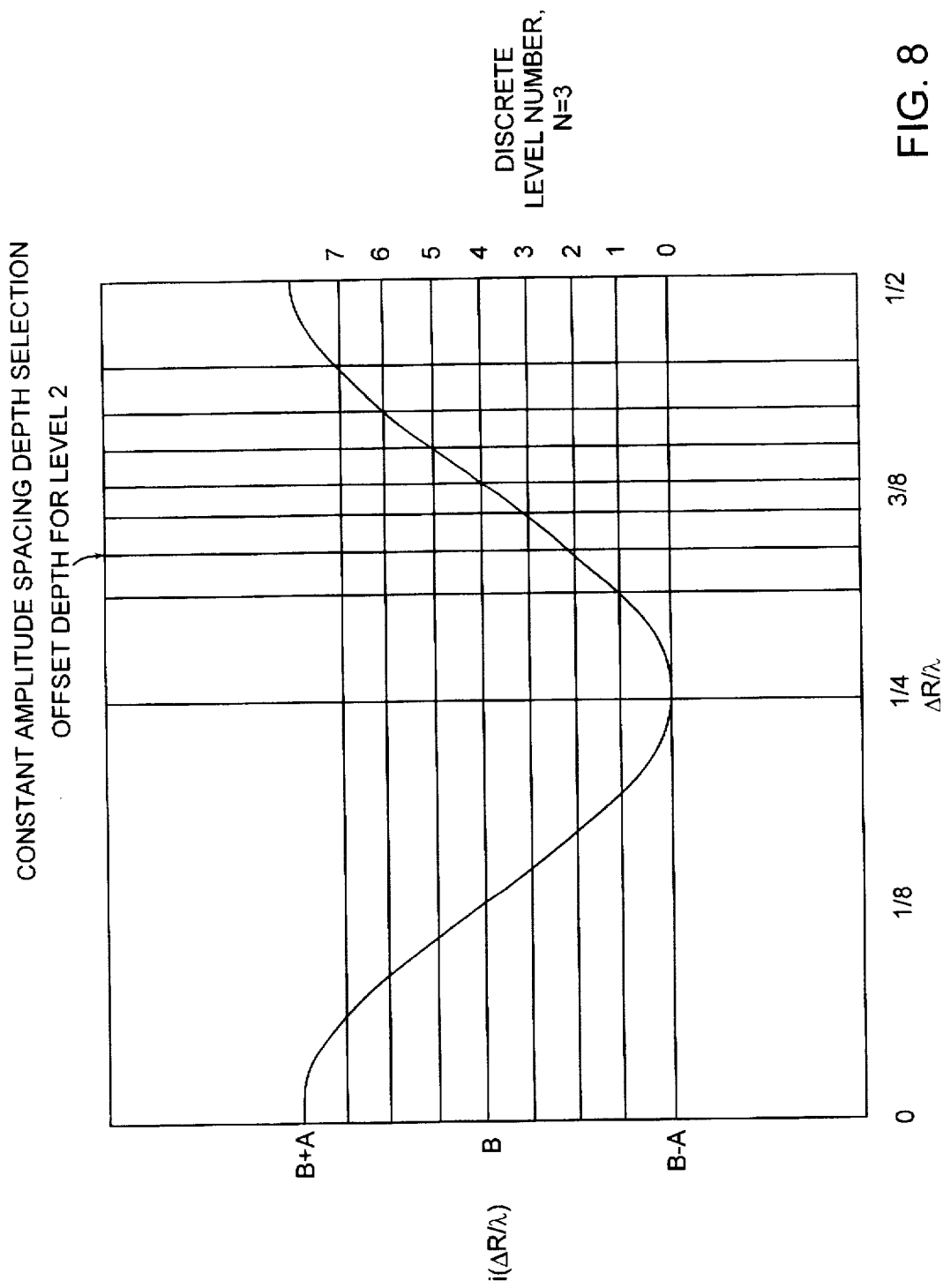
FIG. 8 is graph showing the relationship between a the depth of a storage location and a current generated by an interferometer.

The output current 82 is proportional to the field intensity incident on the detector:

$$i\left(\frac{\Delta R}{\lambda}\right) = K_{PD}|v_{REF} + v_{DATA}(t)|^2$$

$$= K_{PD}\left|K_{REF} + \frac{K_{DATA}}{K_{REF}} v_{REF}\left(t - \frac{2\Delta R}{c}\right)\right|^2$$

$$= B + A\cos\left(4\pi\frac{\Delta R}{\lambda}\right)$$

where $K_{PD}$, $K_{REF}$, $K_{DATA}$ are constants which determine the values of constants B,A; B,A are easily determined by calibration. FIG. 8 is a plot of $i(\Delta R/\lambda)$ vs. $\Delta R/\lambda$ and shows that over the interval $\frac{1}{4} \leq \Delta R/\lambda \leq \frac{1}{2}$, the photodetector output current is a monotonic function of range. This range of distances $\Delta R$ is used as an example. Other ranges of distances are possible. A 3-D disk can encode N binary bits of data per spot by creating $2^N$ discrete range levels with offset distance from the reference plan ($\frac{1}{4} \leq \Delta R^n/\lambda \leq \frac{1}{2}$: n=0,1, ..., $2^N-1$), where $\Delta R^n$ refers to the offset range for discrete level n. This results in a photocurrent which is now a function of n:

$$i(n) = B + A\cos\left(4\pi\frac{\Delta R^n}{\lambda}\right)$$

Figure 9:
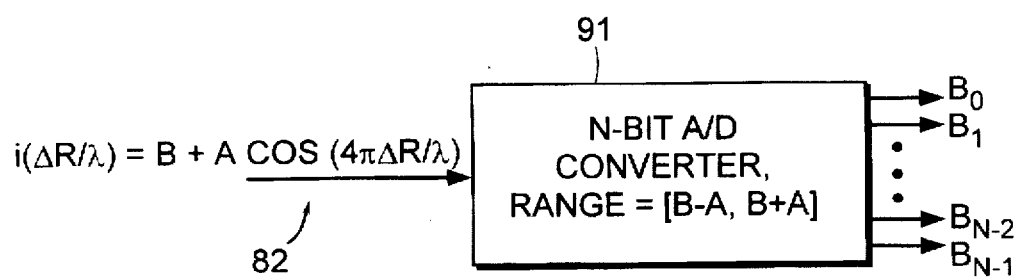
FIG. 9 is a diagram showing the conversion of a current from the interferometric data retrieving system to a digital representation of the stored data.

An extremely simple readout strategy results when $\Delta R^n$ are chosen such that the change in amplitude from level n to level n+1 is a constant, i.e., $\{i(n+1)-i(n)=\Delta I:n=0,1,\ldots,2^N-2\}$. Then, using an analog-to-digital (A/D) converter 91, as shown in FIG. 9, with resolution of N bits and amplitude range [B−A,B+A], the digital output is exactly the N encoded bits at the interrogated spot. It is easy to show that the desired levels are:

$$\Delta R^n = \frac{\lambda}{4\pi}\cos^{-1}\left\{\frac{2n}{2^N} - 1\right\}, n = 0, 1, \ldots, 2^N - 1$$

Thus, digital data is stored on a compact disk in three-dimensions with an information density that is N times that of conventional, two-dimensional disks. We believe that we may achieve as much as N=6 improvement over conventional systems. The actual value depends on the signal-to-noise ratio (SNR) which is a function of, among other factors, the mechanical stability of the readout, the manufacturing tolerances on the disk, the laser power, detector quantum efficiency, disk reflectivity, and disk rotation rate.

Commercial CD players operate at $\lambda$=800 nm and employ optics with a numerical aperture (NA) of about 0.5, resulting in a spot-size, $x_{RES}$=0.94 µm. The depth-of-focus for these systems is $Z_{RES}$=1.7 µm. Auto-focus and auto-tracking circuitry on commercially available units are sufficient to maintain laser read-head positional stability to these tolerances. Since our 3-D medium has range diversity over a single wavelength, our requirement on depth-of-focus is $z_{RES} > \lambda$ to ensure that all in formation-bearing range planes are in focus. For the values above, current systems satisfy this constraint.

Alternative Embodiments

Figure 10:
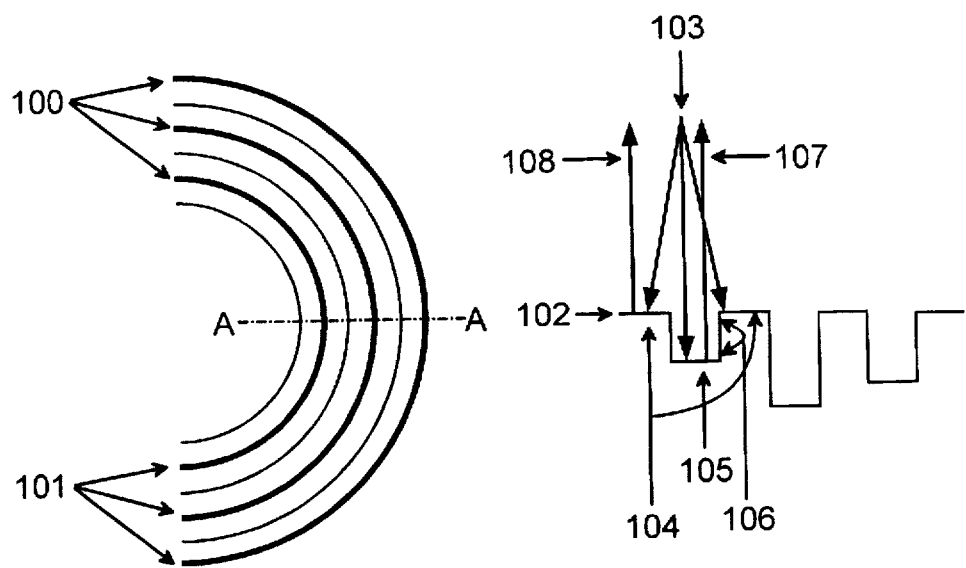
FIG. 10 is a diagram illustrating an alternative embodiment of the invention utilizing range encoding.

There are other methods to produce multiple levels of intensity modulation required to encode multiple bits. Alternative embodiments of the invention remove the requirement for a partially reflective reference layer. In these embodiments, the land areas next to the data track would provide the reference area from which to measure depth. FIG. 10 shows one such alternative embodiment. Data tracks 100 are separated by land areas 101. The land areas 101 and data tracks 100 are formed in the same data layer 102. A depth 106 of a data track 105, $\Delta R$, varies relative to a land areas 104, which is nominally flat. The different depths of the data tracks 100 encode the multiple bit information as illustrated in FIG. 8. In this embodiment, the readout strategy involves directing a laser 103 on both the land area 104 and the data track 105. The depth 106 of a point on data track 105 produces a phase shift in a light 107 reflected from the data track 105 relative to a light 108 reflected from the land area 104 due to the increase in two-way travel time to the data track 105 relative to the land area 104. This phase difference between the light 107 reflected from the land area 104 and the light 108 reflected from data track 105 produces the light intensity modulation that encodes the information from the data track 105 at that point. The amount of light intensity modulation, which produces an amplitude modulation in the current or voltage out of a photodetector determines the value of the data at that point on the data track 105 according to a coding scheme of which FIG. 8 is an example. The land areas 101 now act as the reference layer with data tracks 100 representing data values encoded according to the varying depth of the track.

Figure 11:
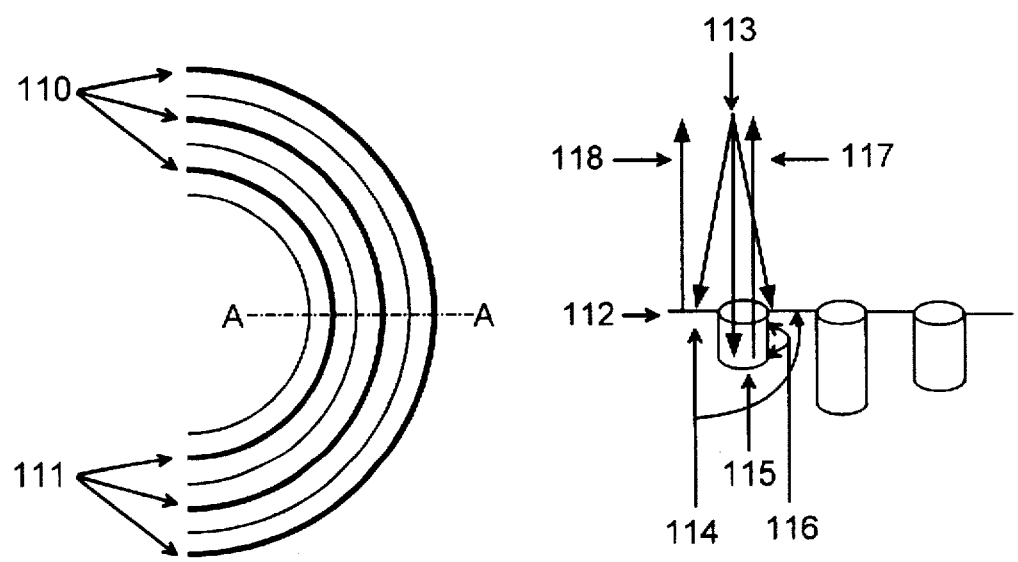
FIG. 11 is a diagram illustrating an alternative embodiment of the invention utilizing range encoding.

Another embodiment, as illustrated in FIG. 11, does not use a continuous track, with each data location contiguous with the next, but rather uses a series of pits 110. In this embodiment, data tracks 110, composed of a series of pits, are paired with land areas 111. The land areas 111 and data tracks 110 are formed in the same data layer 112. A depth 116 of a data pit 115, $\Delta R$, varies relative to a land area 114, which is nominally flat. The different depths of the data pits in data tracks 110 encode the multiple bits of information as illustrated in FIG. 8. In this embodiment, the readout strategy involves directing a laser 113 on both the land area 114 and the data pit 115. The depth 116 of the data pit 115 produces a phase shift in a light 117 reflected from the data pit 115 relative to a light 118 reflected from the land area 114 due to the increase in two-way travel time to the data pit 115 relative to the land area 114. This phase difference between the light 117 reflected from the land area 114 and the light 118 reflected from data pit 115 produces the light intensity modulation that encodes the information from the data pit 115. The amount of light intensity modulation, which produces an amplitude modulation in the current or voltage out of a photodetector determines the value of the data at that data pit 115 according to a coding scheme of which FIG. 8 is an example. The land areas 111 now act as the reference layer with the pits of data tracks 110 representing data values encoded according to the varying depth of the pits.

Figure 12:
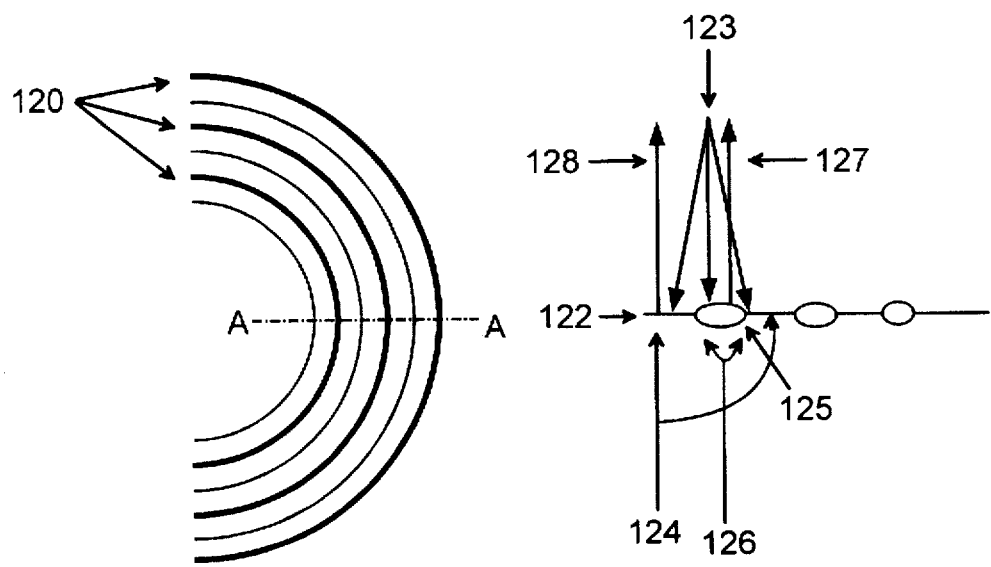
FIG. 12 is a diagram illustrating an alternative embodiment of the invention utilizing pit width encoding.

Another embodiment, as illustrated in FIG. 12, does not use variations of pit depth but rather variations in pit width. In this embodiment, data tracks 120, composed of a series of pits, are paired with land areas 121. The land areas 121 and the data tracks 120 are formed in the same data layer 122. The depth of a data pit 125, ΔR, is nominally fixed relative to the land area 124, which is nominally flat. The different widths of the data pits in data tracks 120 encode the multiple bits of information as illustrated in FIG. 8. In this embodiment, the readout strategy involves directing a laser 123 on both the land area 124 and data pit 125. The depth of the data pit 125 produces a phase shift as in the previous embodiment. Each data pit 125 has associated with it the same depth and so the same phase shift. However, a width 126 of the data pit 125 causes different a amount of a light 128 to be reflected from the land area 124 relative to a light 127 reflected from the data pit 125 and thus produces a different amount of intensity modulation of the light wave on the photodetector. The amount of light intensity modulation, which produces an amplitude modulation in the current or voltage out of a photodetector, determines the value of the data at the data pit 125 according to a coding scheme of which FIG. 8 is an example. The land areas 121 now act as the reference layer with the pits of data tracks 120 representing data values encoded according to the varying width of the pits.

It will be appreciated by those of ordinary skill in the art that the present invention can be embodied in other specific forms without departing from the spirit or essential characteristics thereof. The presently disclosed embodiment is therefore considered in all respects to be illustrative and not restrictive.

What is claimed is:

1. A system for storing and retrieving digital data comprising:

a storage medium including separate storage regions and a partially reflective reference layer spaced above the storage regions, each region storing at least four possible values of digital data encoding at least two bits, and an optical system adapted to determine the at least four possible values of digital data encoding at least two bits at each of the separate storage regions, the system using interferometric measurements between the separate storage regions and the reference layer to determine the at least two bits of digital data.

2. The system of claim 1 wherein each storage region has a depth, said depth being adapted for storing the at least two bits of data.

3. The system of claim 1 wherein each storage region has a width, said width being adapted for storing the at least two bits of data.

4. The system of claim 3, wherein said storage medium comprises an optical disk.

* * * * *

UNITED STATES PATENT AND TRADEMARK OFFICE
CERTIFICATE OF CORRECTION

PATENT NO. : 5,757,763
DATED : May 26, 1998
INVENTOR(S) : Thomas J. Green, Jr., Stephen Marcus, Gary Swanson and Barry Colella It is certified that error appears in the above-identified patent and that said Letters Patent is hereby corrected as shown below:

Column 1, line 7, insert the following:

---Government Support

This invention was made with government support under Contract Number F19628-90-C-0002 awarded by the Air Force. The government has certain rights in the invention.---

Signed and Sealed this

Twenty-seventh Day of October, 1998

Attest:

BRUCE LEHMAN

Attesting Officer

Commissioner of Patents and Trademarks